United States Patent
Atkins et al.

(10) Patent No.: US 12,141,960 B2
(45) Date of Patent: Nov. 12, 2024

(54) CUTTER ANALYSIS AND MAPPING

(71) Applicant: Halliburton Energy Services, Inc., Houston, TX (US)

(72) Inventors: William Brian Atkins, Houston, TX (US); Radompon Sungkorn, Katy, TX (US); Michael Stephen Pierce, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 441 days.

(21) Appl. No.: 17/594,147

(22) PCT Filed: Jun. 10, 2019

(86) PCT No.: PCT/US2019/036343
§ 371 (c)(1),
(2) Date: Oct. 4, 2021

(87) PCT Pub. No.: WO2020/251534
PCT Pub. Date: Dec. 17, 2020

(65) Prior Publication Data
US 2022/0172338 A1  Jun. 2, 2022

(51) Int. Cl.
*G06T 7/00* (2017.01)
*E21B 10/12* (2006.01)
(Continued)

(52) U.S. Cl.
CPC .............. *G06T 7/001* (2013.01); *E21B 10/12* (2013.01); *E21B 10/567* (2013.01);
(Continued)

(58) Field of Classification Search
CPC . G06T 2207/30164; G06T 2207/20081; G06T 2207/20084; G06T 7/0004;
(Continued)

(56) References Cited

U.S. PATENT DOCUMENTS 4,928,521 A   5/1990  Jardine
5,021,675 A   6/1991  Fischer
(Continued)

FOREIGN PATENT DOCUMENTS

CN   106023137 B  * 10/2018
WO   2009079371 A1   6/2009
WO   2018033549 A1   2/2018

OTHER PUBLICATIONS

Search machine translation of CN-106023137-B to Jiang et al., A Wood Counting Method Based On Contour Optimization, translated Mar. 16, 2024, 11 pages. (Year: 2024).*
(Continued)

*Primary Examiner* — Matthew C Bella
*Assistant Examiner* — Dennis Rosario
(74) *Attorney, Agent, or Firm* — DeLizio, Peacock, Lewin & Guerra, LLP

(57) ABSTRACT

A method comprising identifying a cutter on a drill bit based on a drill bit image, assigning a grading value of the cutter based on a classification model of a machine learning system, wherein the classification model is generated based on a set of training cutter images associated with drill bit characteristics indicators, determining a surface parameter based on a surface of the cutter, generating a comparison value based on the surface parameter, and mapping a set of cutter information to the cutter on the drill bit, wherein the set of cutter information comprises the grading value and the comparison value.

10 Claims, 9 Drawing Sheets

(51) Int. Cl.

| | |
|---|---|
| *E21B 10/567* | (2006.01) |
| *E21B 12/02* | (2006.01) |
| *G01N 21/88* | (2006.01) |
| *G01N 21/956* | (2006.01) |
| *G01N 29/44* | (2006.01) |
| *G05B 23/02* | (2006.01) |
| *G06F 18/241* | (2023.01) |
| *G06N 3/02* | (2006.01) |
| *G06N 20/00* | (2019.01) |
| *G06T 7/12* | (2017.01) |
| *G06V 10/26* | (2022.01) |
| *G06V 10/44* | (2022.01) |
| *G06V 10/70* | (2022.01) |
| *G06V 10/764* | (2022.01) |
| *G06V 10/774* | (2022.01) |
| *G06V 10/82* | (2022.01) |
| *G06V 20/80* | (2022.01) |
| *E21B 10/42* | (2006.01) |

(52) U.S. Cl.
CPC ..... *G01N 21/8803* (2013.01); *G01N 29/4418* (2013.01); *G06F 18/241* (2023.01); *G06N 3/02* (2013.01); *G06N 20/00* (2019.01); *G06T 7/0004* (2013.01); *G06T 7/0008* (2013.01); *G06T 7/12* (2017.01); *G06V 10/26* (2022.01); *G06V 10/454* (2022.01); *G06V 10/70* (2022.01); *G06V 10/764* (2022.01); *G06V 10/768* (2022.01); *G06V 10/774* (2022.01); *G06V 10/82* (2022.01); *G06V 20/80* (2022.01); *E21B 10/42* (2013.01); *E21B 12/02* (2013.01); *E21B 2200/20* (2020.05); *E21B 2200/22* (2020.05); *G01N 2021/8854* (2013.01); *G01N 2021/888* (2013.01); *G01N 2021/95615* (2013.01); *G01N 21/95684* (2013.01); *G05B 23/0283* (2013.01); *G06T 2207/20081* (2013.01); *G06T 2207/20084* (2013.01); *G06T 2207/30164* (2013.01); *G06V 2201/06* (2022.01)

(58) Field of Classification Search
CPC . G06T 7/11; G06T 7/13; G06T 7/0002; G06T 2207/30108; G06T 7/001; G06T 7/0008; G06T 7/0006; E21B 2200/22; E21B 12/02; E21B 10/00; E21B 10/633; E21B 47/022; E21B 47/024; E21B 12/00; E21B 2200/20; E21B 10/003; E21B 10/006; E21B 10/12; E21B 10/28; E21B 10/322; E21B 10/325; E21B 10/327; E21B 10/34; E21B 10/345; G06V 10/82; G06V 10/764; G06V 2201/06; G06V 20/41; G06V 2201/03; G06V 20/52; G06V 30/10; G06V 30/19173; G06V 30/422; G06V 20/698; G06V 10/70; G06V 10/454; G06V 10/26; G06V 30/36; G06V 10/765; G06V 10/768; G06V 10/778; G06V 10/809; G06V 10/811; G06V 10/87; G06V 20/49; G06V 20/80; G06N 3/08; G06N 20/00; G06N 3/02; G06N 3/0464; G06N 5/025; G06N 5/04; G06N 3/09; G06F 18/24; G06F 30/27; G06F 18/241; G06F 18/2411; G06F 2218/12; G06F 18/2431; G06F 16/906; G01N 29/4418; G01N 29/4481; G01N 21/88; G01N 21/8803; G01N 2021/8854; G01N 21/8851; G01N 2021/888; G01N 2021/8887; G01N 2021/889; G01N 2021/8893; G01N 21/95607; G01N 2021/95615; G01N 21/956; G01N 21/95684; G05B 19/4183; G05B 23/0283; G05B 2219/37434; G05B 2219/45129; G05B 13/027; G05B 13/0265; G05B 13/0285; G05B 13/029; G05B 23/00; G05B 23/0267; G05B 23/0259

See application file for complete search history.

(56) References Cited

U.S. PATENT DOCUMENTS

| | | | |
|---|---|---|---|
| 5,730,234 | A | 3/1998 | Putot |
| 5,871,391 | A | 2/1999 | Pryor |
| 7,372,977 | B2 * | 5/2008 | Fujimura ............ G06V 40/103 382/103 |
| 8,374,835 | B2 | 2/2013 | Lind et al. |
| 8,738,342 | B2 | 5/2014 | Lind et al. |
| 8,760,668 | B1 | 6/2014 | Wiggins et al. |
| 9,792,530 | B1 | 10/2017 | Wu et al. |
| 11,578,583 | B2 | 2/2023 | Samuel |
| 2002/0138240 | A1 | 9/2002 | Jelley et al. |
| 2005/0096847 | A1 | 5/2005 | Huang et al. |
| 2008/0040084 | A1 | 2/2008 | Huang |
| 2008/0262810 | A1 | 10/2008 | Moran et al. |
| 2012/0290206 | A1 | 11/2012 | Hartmann et al. |
| 2015/0287150 | A1 | 10/2015 | Meerdo et al. |
| 2015/0314411 | A1 | 11/2015 | Samukawa et al. |
| 2017/0032061 | A1 | 2/2017 | Izbinski et al. |
| 2018/0181105 | A1 | 6/2018 | Shindou |
| 2018/0246494 | A1 | 8/2018 | Nakahama |
| 2019/0145183 | A1 * | 5/2019 | Potash .................. E21B 10/00 700/175 |
| 2021/0174486 | A1 * | 6/2021 | Chowhan ................ G06F 18/25 |
| 2022/0168862 | A1 | 6/2022 | Atkins et al. |
| 2022/0282609 | A1 | 9/2022 | Samuel |

OTHER PUBLICATIONS

PCT Application Serial No. PCT/US2019/036343, International Search Report, mailed Mar. 6, 2020, 3 pages.
PCT Application Serial No. PCT/US2019/036343, International Written Opinion, mailed Mar. 6, 2020, 8 pages.
PCT Application Serial No. PCT/US2019/036353, International Search Report, mailed Mar. 9, 2020, 6 pages.
PCT Application Serial No. PCT/US2019/036353, International Written Opinion, mailed Mar. 9, 2020, 6 pages.
PCT Application Serial No. PCT/US2019/036362, International Search Report, mailed Mar. 5, 2009, 4 pages.
PCT Application Serial No. PCT/US2019/036362, International Written Opinion, mailed Mar. 5, 2009, 5 pages.
"U.S. Appl. No. 17/594,161, Non-Final Office Action", Jan. 5, 2024, 23 pages.

* cited by examiner

CUTTER ANALYSIS AND MAPPING

BACKGROUND

Boreholes may be drilled into the Earth using a drill bit having a plurality of cutters disposed on a bit body. The cutters may include super-hard, wear-resistant materials such as a polycrystalline diamond compact (PDC) secured to a tungsten carbide substrate. During drilling, physical contact between the cutters and the material being drilled will eventually wear or otherwise degrade the cutters, despite the use of these materials.

BRIEF DESCRIPTION OF THE DRAWINGS

Embodiments of the disclosure may be better understood by referencing the accompanying drawings.

DETAILED DESCRIPTION

Figure 1:
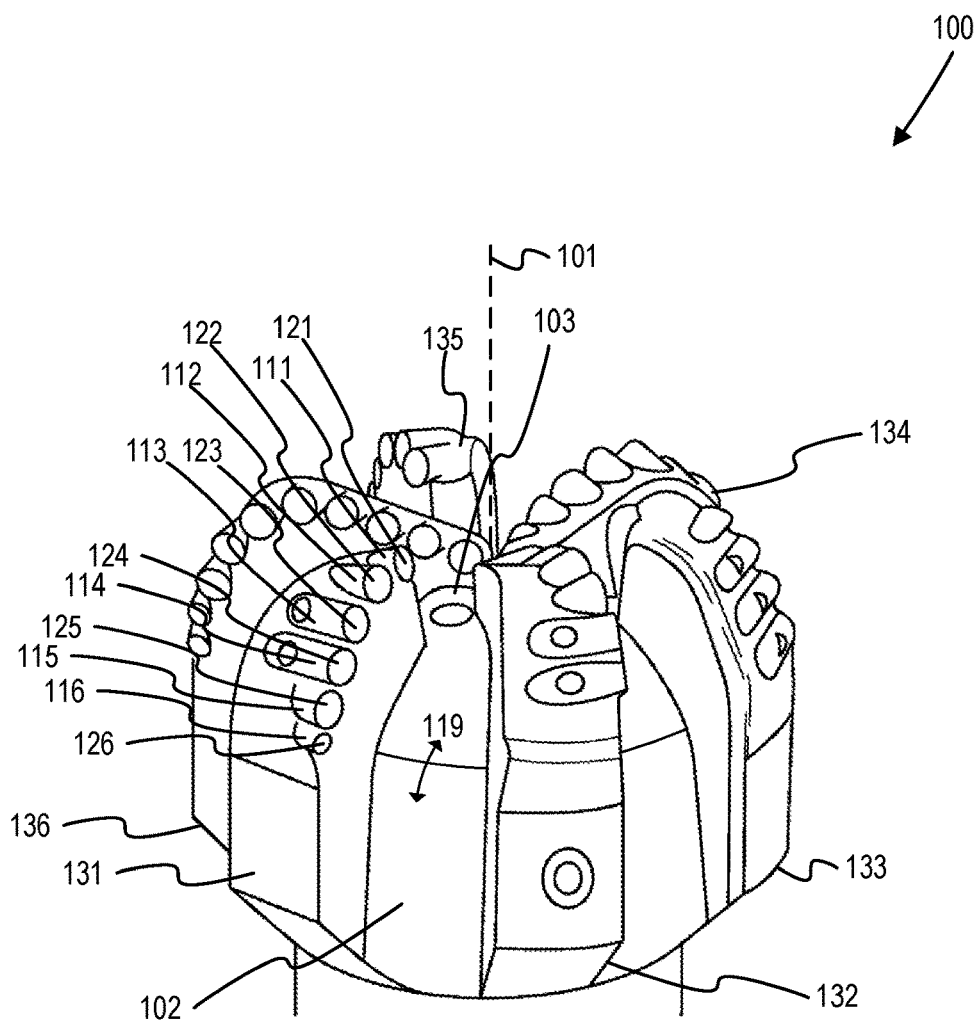
FIG. 1 is an isometric view of a drill bit.

The description that follows includes example systems, methods, techniques, and program flows that embody elements of the disclosure. However, it is understood that this disclosure can be practiced without these specific details. For instance, this disclosure refers to round cutters. Aspects of this disclosure can instead be applied to other cutter shapes such as triangular cutters, rectangular cutters, conical cutters, etc. In other cases, well-known instruction instances, protocols, structures and techniques have not been shown in detail in order not to obfuscate the description.

Various embodiments can relate to a method and related mapping systems for mapping cutter information to cutters on a drill bit model. The mapping system can be a machine learning system that analyzes an image of a drill bit to identify one or more cutters and corresponding cutter positions on the drill bit, wherein a machine learning system includes one or more neural networks. The identification can be based on an object recognition model of the machine-learning system, wherein one or more of the weights of the machine-learning system are based on the object recognition model. The machine learning system can include one or more neural networks. The mapping system can then determine and assign a grading value of the cutter based on a classification model, wherein the grading value is determined based on characteristics of the cutter ("cutter characteristics"). The mapping system can classify one or more of the cutter characteristics as a primary characteristic or a secondary characteristic.

In some embodiments, the area of a cutter covered by a surface-facing wear-resistant material such as PDC ("covered area") on a surface of the cutter can be determined using a surface parameter, wherein the surface parameter can be determined using a boundary-fitting method and a segmentation method. The boundary-fitting method can include determining a surface parameter such as the boundary of the surface of the cutter ("surface boundary"). The segmentation method can include finding an area of the surface that is covered based on the brightness values or other coloration values of the pixels in an image representing the cutter in the surface boundary. Similarly, the segmentation method can be used to determine an area of the cutter surface that is uncovered. The mapping system can generate a comparison value, such as a ratio based on a comparison of the covered area and uncovered area. Alternatively, the mapping system can generate the comparison value based on other surface parameters, such as values generated using machine-learning classification network. The mapping system can then map context-specific cutter information such as the comparison value and the grading value in conjunction with other information, such as the cutter position, to specific cutters in a three-dimensional (3D) model of the drill bit.

The mapped information can be used to provide a prediction of cutter performance during a drilling operation based on operation-specific conditions. For example, in contrast to predictions based only on cutter position, incorporation of context-specific information such as images showing cutter degradation can provide greater accuracy when predicting the lifespan of a cutter on a drill bit. With the context-specific cutter information, drilling operations can be improved in a very practical way, by providing more accurate and consistent information as to: when a drill bit should be examined, when a drill bit cutter should be rotated, and/or when a drill bit cutter should be replaced. Example well operations can include drilling operations, fishing operations, well stimulation operations, and/or well injection operations.

Example Drill Bit and Drill Bit Image Acquisition System

FIG. 1 is an isometric view of a drill bit. In FIG. 1, the drill bit 100 is adapted for drilling through formations of rock to generate a borehole. Drill bit 100 includes a bit axis 101, a bit face 103 formed on the end of the drill bit 100 and drill blades 131-136. The drill blades 131-136 can be angularly spaced-apart, extending from the bit body 102, and be integrally formed as part of the bit body 102. The drill blades 131-136 extend radially across the bit face 103 and longitudinally along a portion of the periphery of the drill bit 100. It should be understood that as used herein, the term "radial" or "radially" refers to positions or movement substantially perpendicular to the direction of bit axis 101. In addition, it should be understood that as used herein, the term "axial," "axially", or "longitudinally" refers to positions or movement generally parallel to the direction of bit axis 101.

Bit cutters are mounted on the drill blades 131-136. The drill blades 131-136 are separated by grooves which define drilling fluid flow paths 119 between and along the cutting faces of the bit cutters. Forces applied onto a material from the faces of bit cutters distributed along the bottom and side of the drill blades can be used to drill away material. For example, the bit cutters 111-116 distributed along the bottom and side of the drill blade 131 can apply force on a material via their respective cutter surfaces 121-126. While the bit cutters 111-116 are shown as round cutters, the bit cutters on the drill bit 100 can have many other shapes.

In some embodiments, a system can store a three-dimensional (3D) model of the drill bit 100 that includes identifier values for cutters in the 3D model. For example, each of the bit cutters 111-116 can be associated with an identifier value in the 3D model such as a string "bit1-blade3-cutter003x-type3" or a numeric identifier "0398621." As described further below, context-specific cutter information corresponding with each of the bit cutters 111-116 can be assigned to their respective cutter via the cutter identifier, such that the information is mapped to its respective cutter.

Figure 2:
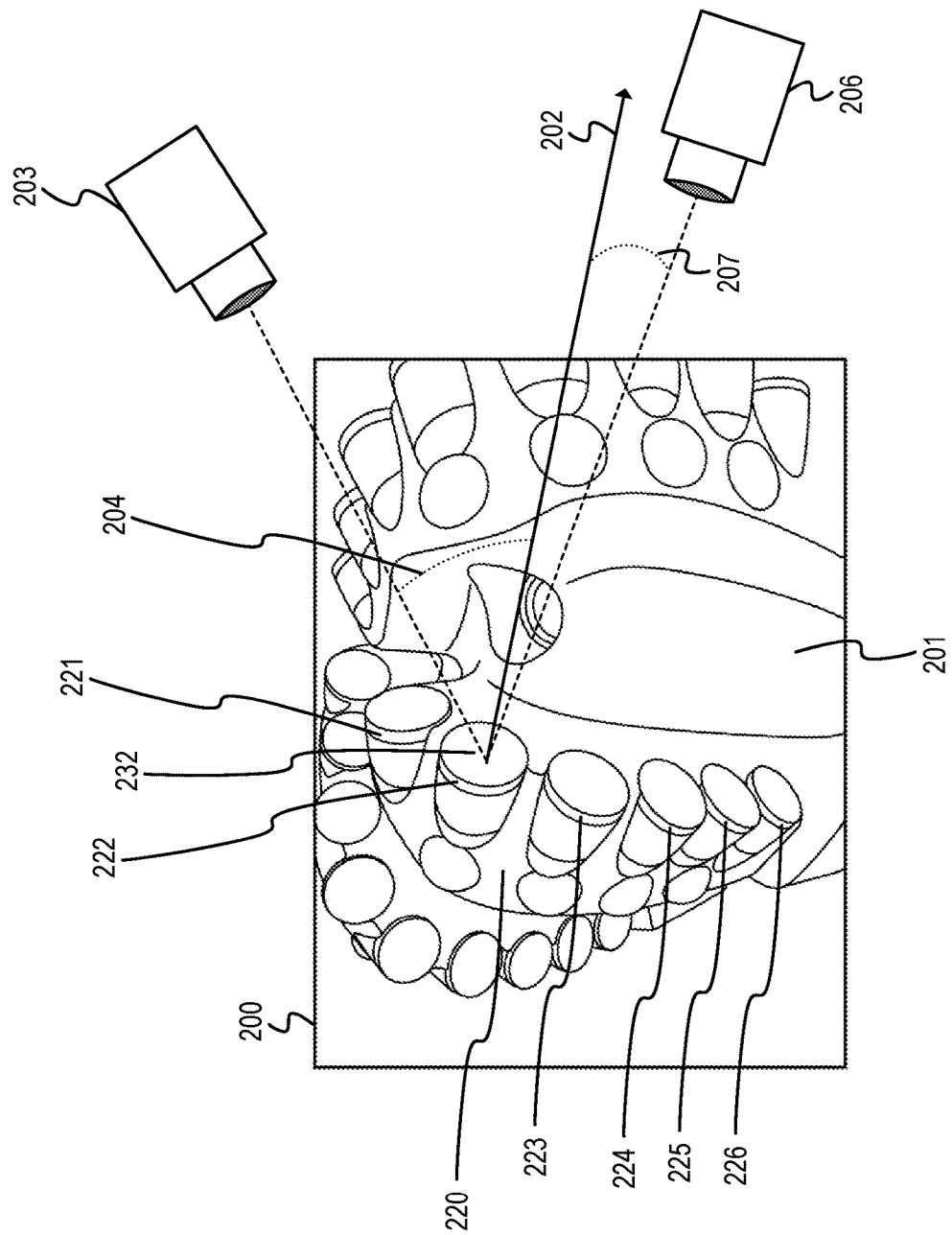
FIG. 2 is an isometric view of a drill bit portion and two different camera angles used to acquire images of the drill bit portion.

FIG. 2 is an isometric view of a drill bit portion and two different camera angles used to acquire images of the drill bit portion. The box 200 is an isometric view of a portion of a drill bit 201 that includes a drill blade 220. Drill bit 201 may be similar to or identical to drill bit 100 of FIG. 1. Referring now to FIG. 2, it can be seen that the drill blade 220 includes a set of bit cutters 221-226 distributed along the drill blade. The drill cutters 221-226 are positioned at various positions along the drill blade 220, wherein the bit cutter 221 is at a bottom position of the drill bit 201, and wherein the bit cutter 226 is positioned at an end position, with cutters 222-225 spaced apart from each other, and positioned along the edge of the drill blade 220, between cutters 221 and 226.

A first camera 203 records an image of the drill bit 201 at a first camera angle 204 with respect to a cutter normal vector 202 that is normal to the cutter surface 232. A second camera 206 records an image of the drill bit 201 at a second camera angle 207 with respect to the cutter normal vector 202. In some embodiments, at least one of the first camera angle 204 and the second camera angle 207 can be between 30 degrees and 60 degrees. In some embodiments, the first camera 203 and/or the second camera 206 can capture an image of each blade of the drill bit 201 at the same angle with respect to the cutter normal vector for that respective blade. For example, the angles 204 and 207 may be equal in some embodiments. In some embodiments, the field of vision for the first camera 203 and the second camera 206 can overlap. For example, images of the drill cutter 222 can be acquired by both the first camera 203 and the second camera 206, with at least a portion of the image acquired by first camera 203 overlapping a portion of the image acquired by the second camera 206. In some embodiments, the first camera 203 and second camera 206 can be physically separate from the drill bit 201. Alternatively, in some embodiments, the first camera 203 and second camera 206 can be attached to a same bottomhole assembly as the drill bit 201.

Example Flowchart

The flowchart described below is provided to aid in understanding the illustrations and is not to be used to limit scope of the claims. The flowchart depicts example operations that can vary within the scope of the claims. Additional operations may be performed; fewer operations may be performed; the operations shown may be performed in parallel; and the operations shown may be performed in a different order. For example, the operations depicted in blocks 304-332 of FIG. 3 can be performed in parallel or serially for multiple cutters on a drill bit. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus, for execution.

Figure 3:
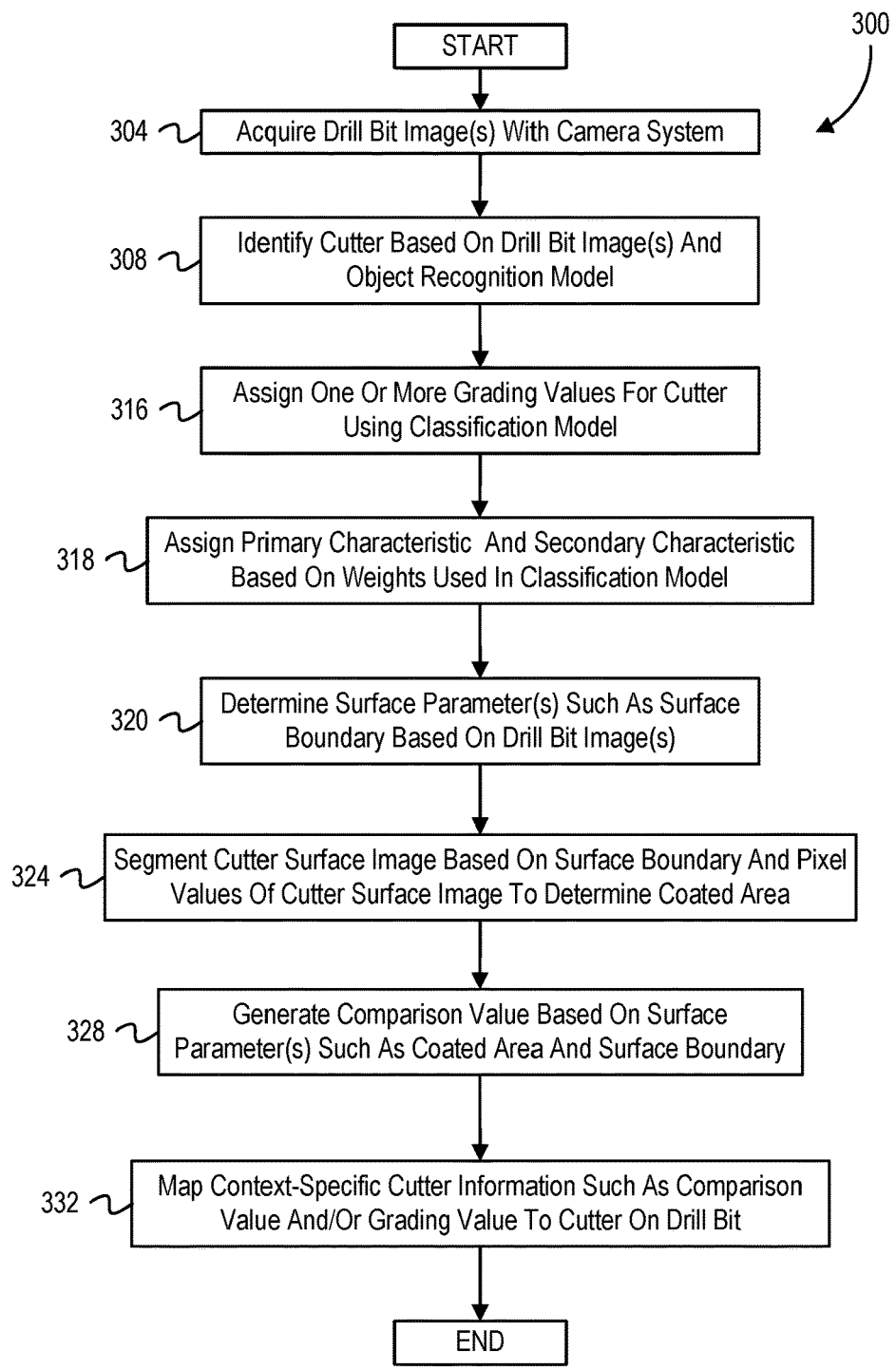
FIG. 3 is a flowchart of operations to map context-specific cutter information to a cutter.

FIG. 3 is a flowchart of operations to map context-specific cutter information to a cutter. FIG. 3 depicts a flowchart 300 of operations to map cutter information using a system that includes a processor. For example, operations of the flowchart 300 can be performed using a system similar to the computer system 898 or computer device 900 shown in FIGS. 8-9, respectively. Operations of the flowchart 300 start at block 304.

At block 304, one or more drill bit images are acquired with a camera system. The camera system can include one or more cameras to acquire the drill bit images. In some embodiments, the one or more cameras of the camera system can be positioned within a range of angles with respect to a normal direction of a drill bit cutter surface. For example, a camera system can be positioned at an angle between a range of 30 degrees to 60 degrees with respect to a normal direction of a drill bit cutter surface.

At block 308, a device or system can operate to identify a cutter based on one or more drill bit images and an object recognition model. In some embodiments, the device or system can use a deep learning system or other machine-learning system that incorporates the object recognition model, wherein a deep learning system includes networks implementing hierarchical algorithms and capable of unsupervised learning from unstructured/unlabeled datasets. The object recognition model can comprise a set of weights corresponding to nodes in a machine learning network and can be generated from training the machine learning system based on a training set of images. For example, an object recognition model can be represented by a hash table [01: 0.52, 02: 0.643, 03: 0.382, 04: 0.4642], wherein each key represents a node connection and each value represents a weight corresponding to the node connection. The training set of images can include a set of images that do not show any cutters and a set of images showing one or more cutters to increase the accuracy of the object recognition model.

In some embodiments, the inputs for the machine-learning system can be values based on sections of an image of a drill bit. For example, each of the sections of the image of the drill bit can be partitioned to an image size similar to or the same as the bounded region 434 shown in FIG. 4, and the inputs to the machine-learning system can be brightness values of these sections. After processing the inputs through one or more layers of the machine-learning system, the machine learning system can generate a cutter probability value, wherein a greater cutter probability value implies a greater probability of including a cutter. In some embodiments, the machine-learning system can determine that a section includes a cutter if the cutter probability value is greater than a cutter probability threshold.

In some embodiments, the device or system can also identify and/or further characterize a cutter based on a corresponding cutter position. The device or system can determine a cutter position based on the machine-learning-identified bit cutter and a 3D model of the drill bit. The cutter position can include one or more coordinates with respect to a bit axis. The device or system can determine a cutter position of a cutter based on a 3D model of the drill bit. For example, with reference to FIG. 1, the device or system can use machine-learning results to determine an approximate position of an identified cutter and compare the approximate position of the identified cutter to positions of the cutters 111-116 on a 3D drill bit model of the drill bit 100. The device or system can then determine that the approximate position is nearest to the position of the bit cutter 111 on the drill bit 100 and that thus the position of the identified cutter is the position of the bit cutter 111 on the drill bit 100. In addition, the device or system can use the machine learning system to predict a cutter position after training the machine learning system based on a set of images of cutters and their corresponding cutter positions.

At block 316, the device or system can assign one or more grading values for the cutter using a classification model. A grading value can include any quantitative or categorical value based on one or more cutter characteristics. In some embodiments, the classification model can include a neural network of a machine-learning system, wherein the machine-learning system can be part of the same machine-learning system described above for block 308. The neural network of the machine learning system can be trained on a training set comprising cutter training images and a corresponding set of training classifications for cutters. In some embodiments, the set of training classifications can be labeled by subject matter experts (SMEs). In some embodiments, the classification model can analyze various cutter characteristics as classification model inputs, wherein the cutter characteristics can include indicators such as such as worn teeth ("WT"), low bonding ("LB"), small pitting ("SP"), junk damage ("LD"), erosion ("ER"), and quantitative characteristics such as a cutter severity of 5 degrees, etc. For example, the classification model inputs can include cutter characteristics such as a Boolean value indicating whether the cutter has worn teeth, a categorical value indicating the approximate amount of pitting on a cutter, and a numerical value indicating the degree difference between a cutter severity and a severity reference value. Furthermore, in some embodiments, the grading value can be a cutter characteristic itself.

Alternatively, or in addition, the classification model can also be implemented as a set of rules. For example, in some cases the grading value can be from a sequential order wherein "A" is the greatest grading value corresponding with the greatest quality, and "B" is the second-greatest grading value corresponding with the second-greatest quality. A rule of the classification model can enforce the condition that any cutter having a severity value greater than 5 degrees cannot having a grading value of "A". In some embodiments, the classification model can include a combination of rules and the machine-learning system discussed above.

At block 318, the device or system can assign a primary characteristic and a secondary characteristic based on the weights used by the classification model. In some embodiments, the device or system can provide one or more primary and secondary characteristics to further characterize an identified cutter based on the weights used to determine the cutter value. For example, a first set of nodes of a classification model can correspond with a characteristic related to cutter chipping, and a second set of nodes of a classification model can correspond with a characteristic related to surface wearing. In response to the nodes corresponding with erosion having the highest quantitative effect in determining a grading value and the nodes corresponding with a worn bit having a second highest quantitative effect in determining the grading value, the device or system can set "ER" as the primary characteristic and "WT" as the secondary characteristic. In some embodiments, the system can have quantitative characteristics. For example, the primary characteristic can be the cutter having a severity of 10 degrees. In addition, the determination of a primary characteristic and secondary characteristic can also be performed use a neural network of a machine learning system that can be the same as the machine learning system described above. The neural network can be trained based on a set of data comprising cutter images and a corresponding set of indicators representing cutter characteristics and whether the cutter characteristics are primary characteristics or secondary characteristics.

At block 320, the device or system can determine one or more surface parameters such a surface boundary based on the respective cutter's drill bit image(s). In some embodiments, the device or system can fit a surface boundary to the surface of each cutter on a bit based on the respective cutter's surface image. In some embodiments, the cutter surface image can be the same image as the drill bit image described above, or a region thereof. Alternatively, the cutter image can be another image of the cutter taken at a different angle than the drill bit image. In some embodiments, the surface boundary can be determined using an edge-detection method and fitted using a fitting method such as an interpolation fitting method, a machine-learning fitting method, a function fitting method, etc. Alternatively, or in addition, a pre-determined surface boundary can be transformed to an angled boundary by applying a transformation based on the angle at which the image of the cutter surface is acquired. For example, if the pre-determined surface boundary is a circle and the image of the cutter surface is acquired at an angle of 45 degrees, the circle can be transformed an ellipse using one or more rotation tensors based on a rotation of 45 degrees. Alternatively, or in addition, the system can generate a surface parameter using a machine learning classification system. For example, the system can analyze the respective cutter's surface image to generate a machine-interpretable output set of values corresponding to a quality indicator distinct from the grading value.

At block 324, the device or system can segment the cutter surface image based on the surface boundary and pixel values of the cutter surface image to determine a covered area of the cutter. In some embodiments, the device or system can segment the cutter surface image based on a comparison of brightness values of the pixels with a threshold brightness within the surface boundary. For example, a device or system can determine whether a pixel in a region bounded by the surface boundary has a brightness value greater than a threshold brightness, and determine that the portion of the surface corresponding with the pixel having a brightness value that exceeds the threshold is part of the covered area. Alternatively, or in addition, segmentation methods based on the surface boundary can be used. For example, the device or system can generate a set of pixel brightness values used to fit the surface boundary based on a set of known covered surface boundaries, and use the minimum brightness of this set of pixel brightness values as a brightness threshold.

At block 328, the device or system can generate a comparison value based on the one or more surface parameters such as a covered area and the surface boundary. In some embodiments, the comparison value can be generated based on a ratio of the covered area with the area contained by the surface boundary. For example, the covered area can correspond to 80 pixels and the area within the surface boundary can correspond to 100 pixels, setting the comparison value of the ratio to be 80%. Alternatively, or in addition, the comparison value can be fixed as the ratio between a covered area and an uncovered area. For example, the device or system can generate the comparison value by determining the extent of an uncovered region (by taking a difference between the covered surface and the area within the surface boundary), and then setting the comparison value to be equal to the ratio of the covered surface and the uncovered surface. Alternatively, the system can generate the comparison value using a machine learning classification method that can take the surface parameter as an input to generate the comparison value. For example, a neural network can be configured to acquire drill bit images as input and provide comparison values as outputs. This neural network can be trained on a set of training images comprising images of drill bit cutters having cutter surfaces covered in PDC and images of drill bit cutters having cutter surfaces not covered in PDC, wherein each of the images are labeled to reflect if the cutters in the drill bit images are covered by PDC and/or the area of the cutter surface that is covered. This neural network that provides comparison values as output can be part of the machine learning system described above for at least blocks 308, 316 and 318.

At block 332, the device or system can map context-specific cutter information, such as the comparison value and/or the grading value, to a specific cutter on the drill bit. Context-specific cutter information can include various results determined using the operations above, such as a cutter grading value, the cutter surface boundary, covered and/or uncovered areas on the surface of the cutter, etc. In some embodiments, the device or system can map context-specific cutter information to each bit cutter on a drill bit. Once the context-specific cutter information is mapped to a corresponding set of cutters, operations of the flowchart 300 can be considered complete.

Example Image Acquisition and Cutter Identification System

Figure 4:
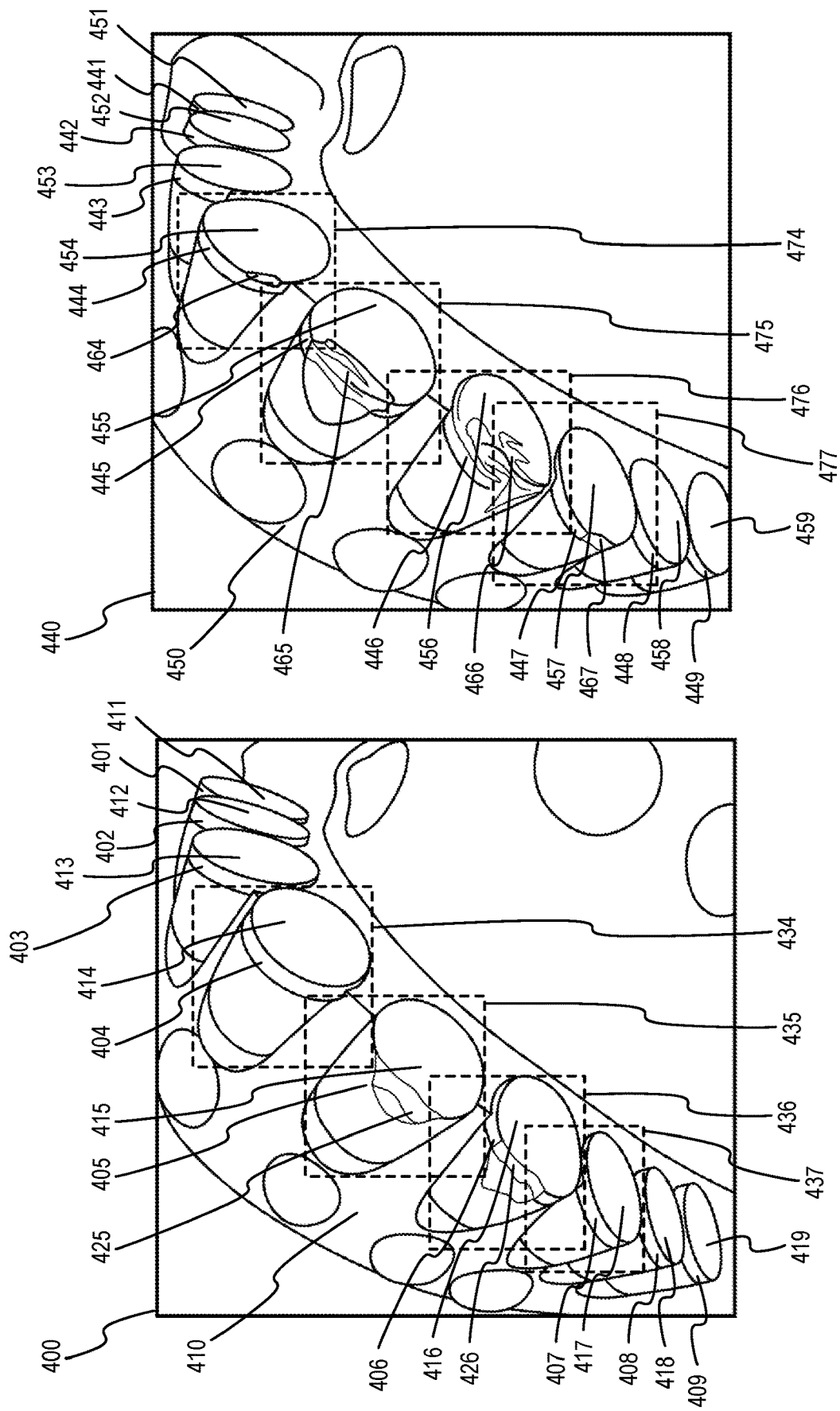
FIG. 4 is a set of isometric views of identified cutters on different blades of a drill bit.

FIG. 4 is a set of isometric views of identified cutters on different blades of a drill bit. With reference to FIG. 2, each of the first box 400 and the second box 440 include an isometric view of a drill bit 201. The first box 400 includes a first blade 410 with bit cutters 401-409, wherein each of the bit cutters 401-409 have a corresponding cutter surface within the set of cutter surfaces 411-419. One or more of the bit cutters 401-409 can include physical degradation, such as having their PDC layer worn off at their respective cutter surface. For example, the bit cutter 405 show a degraded portion 425 at the cutter surface 415, and the bit cutter 406 shows a degraded portion 426 at the cutter surface 416. With further reference to FIG. 3, using operations described for block 308, a device or system can identify one or more of the bit cutters 401-409. The device or system can identify a cutter by generating an identifier value for a cutter and assigning a bounded region corresponding to the cutter. For example, a device or system can identify each of the bit cutters 414-417 by generating a set of identifier values and mapping each of the set of bounded regions 434-437 to each of the respective identifier values.

The second box 440 includes a second blade 450 with bit cutters 441-449, wherein each of the bit cutters 441-449 have a corresponding cutter surface within the set of cutter surfaces 451-459. One or more of the bit cutters 441-449 can include physical degradation, such as having their PDC coating worn off at their respective cutter surface. For example, the bit cutter 445 shows a degraded portion 465 at the cutter surface 455, and the bit cutter 446 shows a degraded portion 466 at the cutter surface 456. With further reference to FIG. 3, using operations described for block 308, a device or system can identify one or more of the bit cutters 441-449. The device or system can identify a cutter by generating an identifier value for a cutter and assigning a bounded region corresponding to the cutter. For example, the device or system can identify each of the bit cutters 444-447 by generating a set of identifier values and mapping each of a set of bounded regions 474-477 to each of the respective identifier values.

Example Analysis System Operations

Figure 5:
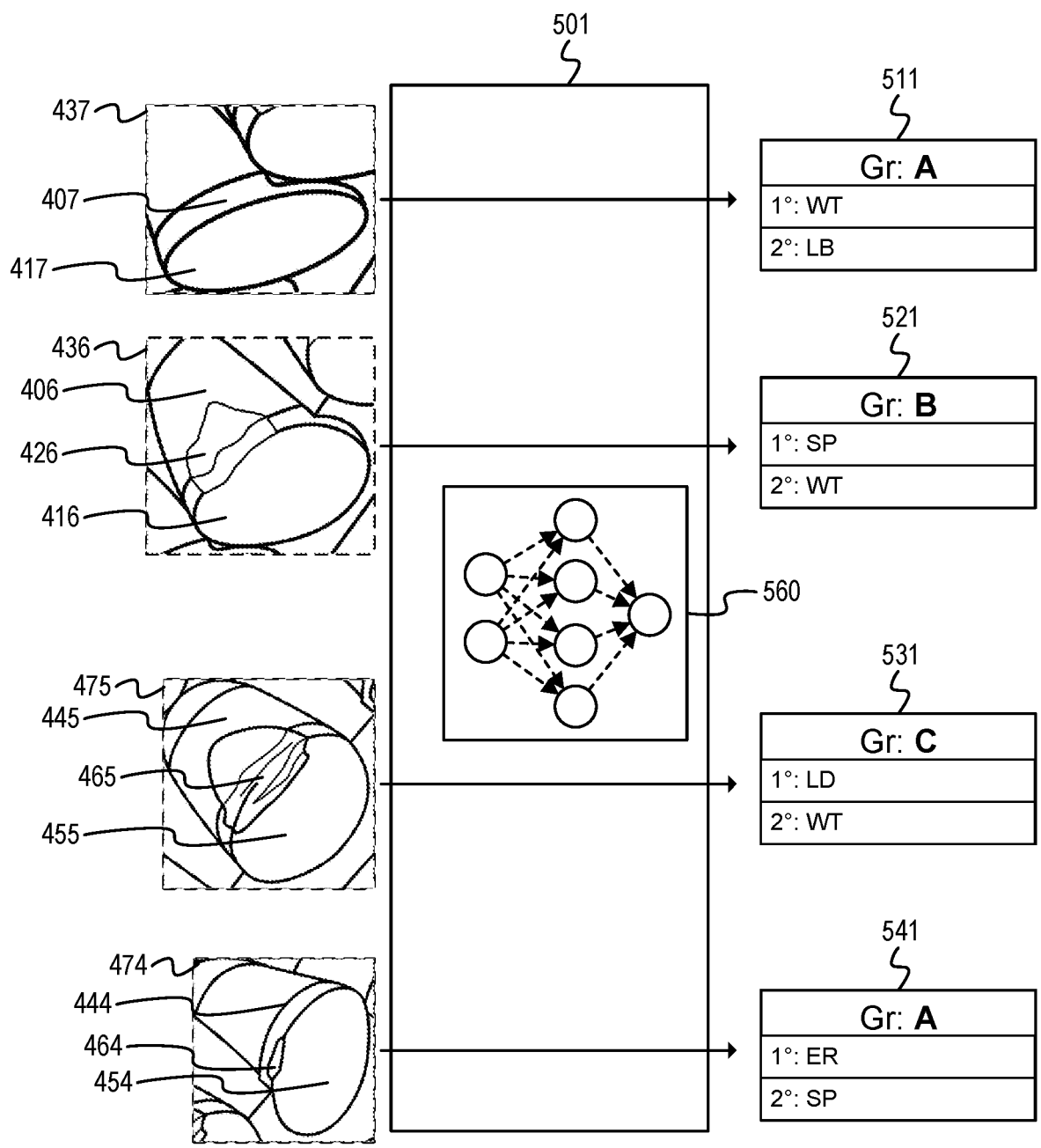
FIG. 5 includes a set of example grading values and characteristics of identified cutters shown in FIG. 4 that can be mapped to the cutters of the drill bit.

FIG. 5 includes a set of example grading values and characteristics of identified cutters shown in FIG. 4 that can be mapped to the cutters of the drill bit. Each of the bounded regions 436, 437, 474 and 475 represents an image of one cutter from the identified set of bit cutters 406, 407, 444 and 445 and can be evaluated using a grading system 501. The bit cutter 406 includes a cutter surface 416 and a degraded portion 426. The bit cutter 407 includes a cutter surface 417. The bit cutter 444 includes a cutter surface 454 and a degraded portion 464. The bit cutter 445 includes a cutter surface 455 and a degraded portion 465.

The grading system 501 can comprise a neural network 560 (further described in FIG. 6 below), which may in turn be realized as various program code packages trained to grade cutters. Alternatively, or in addition, the grading system 501 can include one or more other machine-learning systems such as a second feed forward neural network, a deep recurring neural network, etc. The grading system 501 can be used to classify each of the bit cutters 406, 407, 444 and 445 with the grading results 511, 521, 531, 541. The grading result 511 includes a grading value that may comprise a letter grade and/or a numerical grade. For example, the grading result 511 can include a result of "A." The grading result 511 also includes a primary characteristic of "WT" in response to a determination that the nodes of the neural network 560 (or machine-learning system) corresponding with worn cutters had the greatest quantitative effect in determining the grading value. In addition, the grading result 511 includes a secondary characteristic "LB" in response to a determination that the nodes corresponding with low surface bonding had the second greatest quantitative effect in determining the grading value. In alternative embodiments, a grading result can include a primary attribute without any secondary characteristics. In some embodiments, a grading value can include a cutter severity value. For example, a grading value for a cutter can include a quantitative angular measurement of the severity of the cutter and/or an angular difference from a target cutter severity value.

The grading result 521 includes a grading value "B." The grading result 521 also includes a primary characteristic "SP" in response to a determination that the nodes corresponding with pitting had the greatest quantitative effect in determining the grading value and the classifier result using these nodes is "small pitting." In addition, the grading result 521 also includes a secondary characteristic of "WT" in response to a determination that the nodes corresponding with worn cutters had the greatest quantitative effect in determining the grading value grading value and the classifier result using these nodes is "worn teeth."

The grading result 531 includes a grading value "C." The grading result 531 also includes a primary characteristic of "LD" in response to a determination that the nodes corresponding with cutter integrity had the greatest quantitative effect in determining the grading value and the classifier result using these nodes is "junk damage." In addition, the grading result 531 includes a secondary characteristic "WT" in response to a determination that the nodes corresponding with worn cutters had the greatest quantitative effect in determining the grading value and the classifier result using these nodes is "worn teeth."

The grading result 541 includes a grading value "A." The grading result 541 also includes a primary characteristic "ER" in response to a determination that the nodes corresponding with cutter surface erosion had the greatest quantitative effect in determining the grading value and the classifier result using these nodes is "erosion." In addition, the grading result 541 also includes a secondary characteristic of "SP" in response to a determination that the nodes corresponding with cutter integrity had the second greatest quantitative effect in determining the grading value and the classifier result using these nodes is "small pitting."

With reference to FIG. 3, each of the grading results 511, 521, 531 and 541 can be mapped to a bit cutter in a 3D model using operations described for block 332. For example, a device or system can map the grading result 511 to an identifier value corresponding to the bit cutter 407 in a 3D model of a drill bit. The device or system can also map the grading result 521 to an identifier value corresponding to the bit cutter 406 in the 3D model. In addition, the device or system can also map the grading result 531 to an identifier value corresponding to the bit cutter 445 in the 3D model. Furthermore, the device or system can also map the grading result 541 to an identifier value corresponding to the bit cutter 444 in the 3D model.

Figure 6:
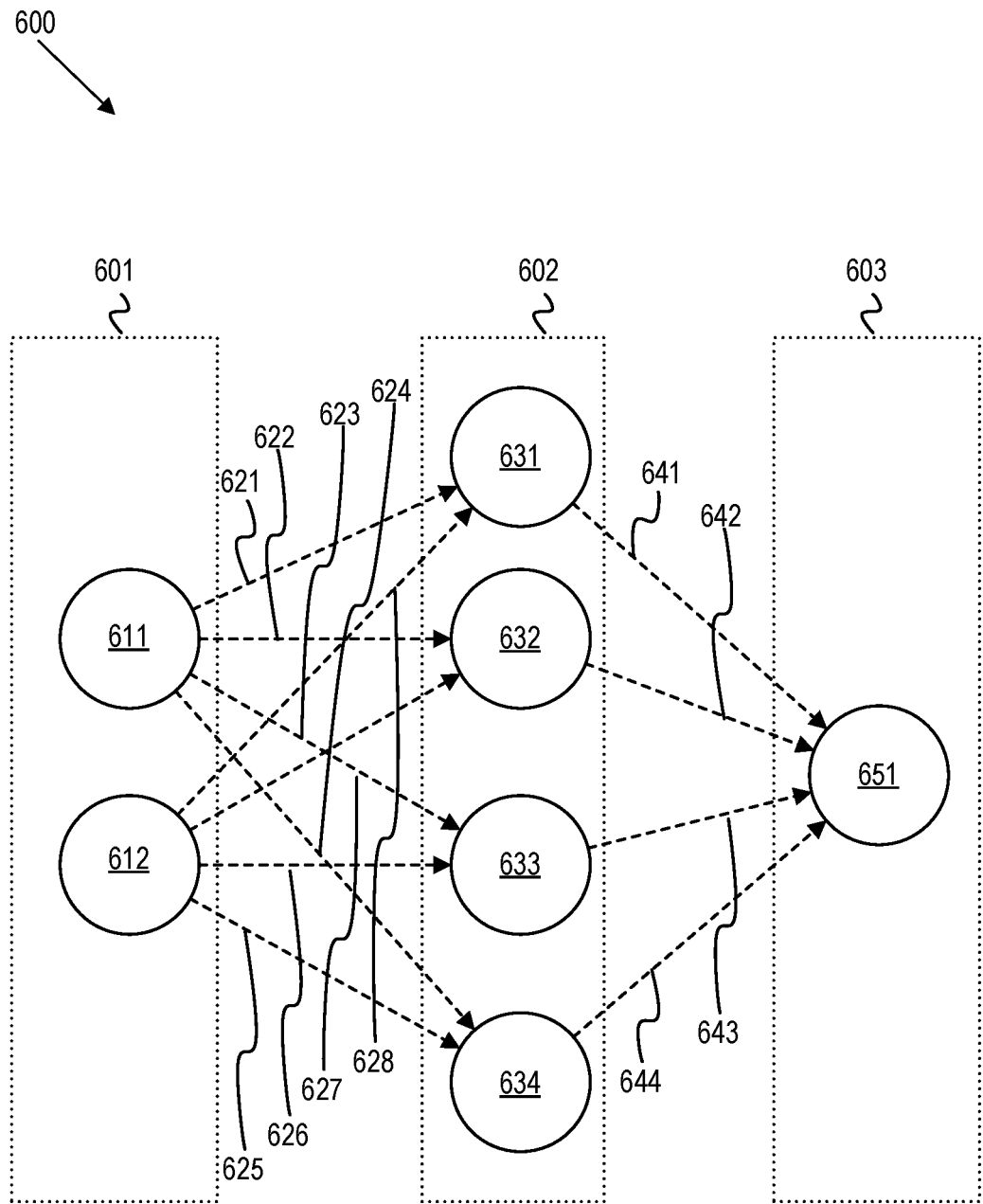
FIG. 6 is an example neural network used to identify a cutter, determine grading values and/or characteristics of the identified cutter.

FIG. 6 is an example neural network used to identify a cutter, determine grading values and/or characteristics of the identified cutter. With reference to FIG. 5 above, the grading system 501 can include the neural network 600. The neural network 600 includes an input layer 601, a hidden layer 602, and an output layer 603. The input layer includes a first input node 611 and second input node 612. The first input node 611 and second input node 612 can represent values such as a pixel brightness, pixel brightness variance within a preset region size, average difference from pixel brightness values of nearest neighbors, etc. While the input layer depicts two input nodes, various other numbers of inputs such as 10 input nodes, 9999 input nodes, etc. can be used.

The hidden layer 602 includes the hidden nodes 631-634, wherein each of the input nodes 611-612 can be connected to the hidden nodes 631-634 with forward connections represented by lines 621-628. The lines 621-624 represent forward connections from the first input node 611 to each of the hidden nodes 631-634. The lines 625-628 represent forward connections from the second input node 612 to each of the hidden nodes 631-634. Each of the connections represented by the lines 621-628 can have an associated weight value that the device or system can apply when sending a node output as an input to another node. For example, the connection represented by the line 621 can have a weight of 0.25, the connection represented by the line 622 can have a weight of 0.5, the connection represented by the line 623 can have a weight of 0.65, and the connection represented by the line 624 can have a weight 0.99. Each of the nodes of the hidden layer can apply an activation function, such as the sigmoidal function shown in Equation 1, to its corresponding input values and sum them. In this case, x represents an output value from a previous node to a receiving node, w represents a corresponding weight value, and f(x) is an output value:

$$f(x) = \frac{1}{1 + e^{-w*x}} \quad (1)$$

The classification model can be or can otherwise include the set of weights associated with some or all of the connections represented by the lines 621-628 and/or values corresponding to the hidden nodes 631-634. For example, the classification model can be the set [conn1: 0.25, conn2: 0.5, conn3: 0.65, conn4: 0.99, conn6: 0.15, conn7: 0.91]. In some embodiments, the hidden node 631-634 can use other functions such as a hyperbolic function, step function, etc. While the hidden layer 602 depicts a single node layer, the hidden layer 602 can include multiple layers of nodes. Furthermore, while the hidden layer 602 is depicted as having four nodes, the hidden layer 602 can include any number of nodes, such as 1000 nodes, 9000 nodes, 1 million nodes, etc.

The output layer 603 includes the output nodes 651-652, wherein the hidden nodes 631-634 can be connected to the output nodes 651 with forward connections represented by lines 641-644. The lines 641-644 represent forward connections from each of the hidden nodes 631-634 to the output node 651. Each of the connections represented by the lines 641-644 can have an associated weight value that the device or system can multiply when sending a node output as an input to another node. For example, the connection represented by the line 641 can have a weight of 0.35, the connection represented by the line 642 can have a weight of 0.15, the connection represented by the line 643 can have a weight of 0.63, and the connection represented by the line 644 can have a weight 0.91. The output node can apply an activation function to its corresponding input values and sum them using the same Equation 1. Alternatively, the activation function of the output node can be one of various other functions such as a hyperbolic function, step function, etc. The output value can then be converted to one or more identified cutter regions, grading results, primary characteristics, and/or secondary characteristics based on a data table. For example, the output value 0.25 can be converted to the grading result of "A." In some embodiments, the output value can be converted to a grading result having a primary value without any secondary characteristics.

In some embodiments, a neural network similar to the neural network 600 can also be used to determine whether a selected image of the drill bit includes an image of a cutter. For example, as described for block 308, the inputs for input nodes similar to nodes 611-612 can be brightness values based on sections of an image of a drill bit. An output node similar to the output node 651 can be used to generate a cutter probability value, wherein a greater cutter probability value implies a greater probability of including a cutter. As described for block 308, the identification of a cutter can be based on the cutter probability value determined by the neural network similar to the neural network 600.

Figure 7:
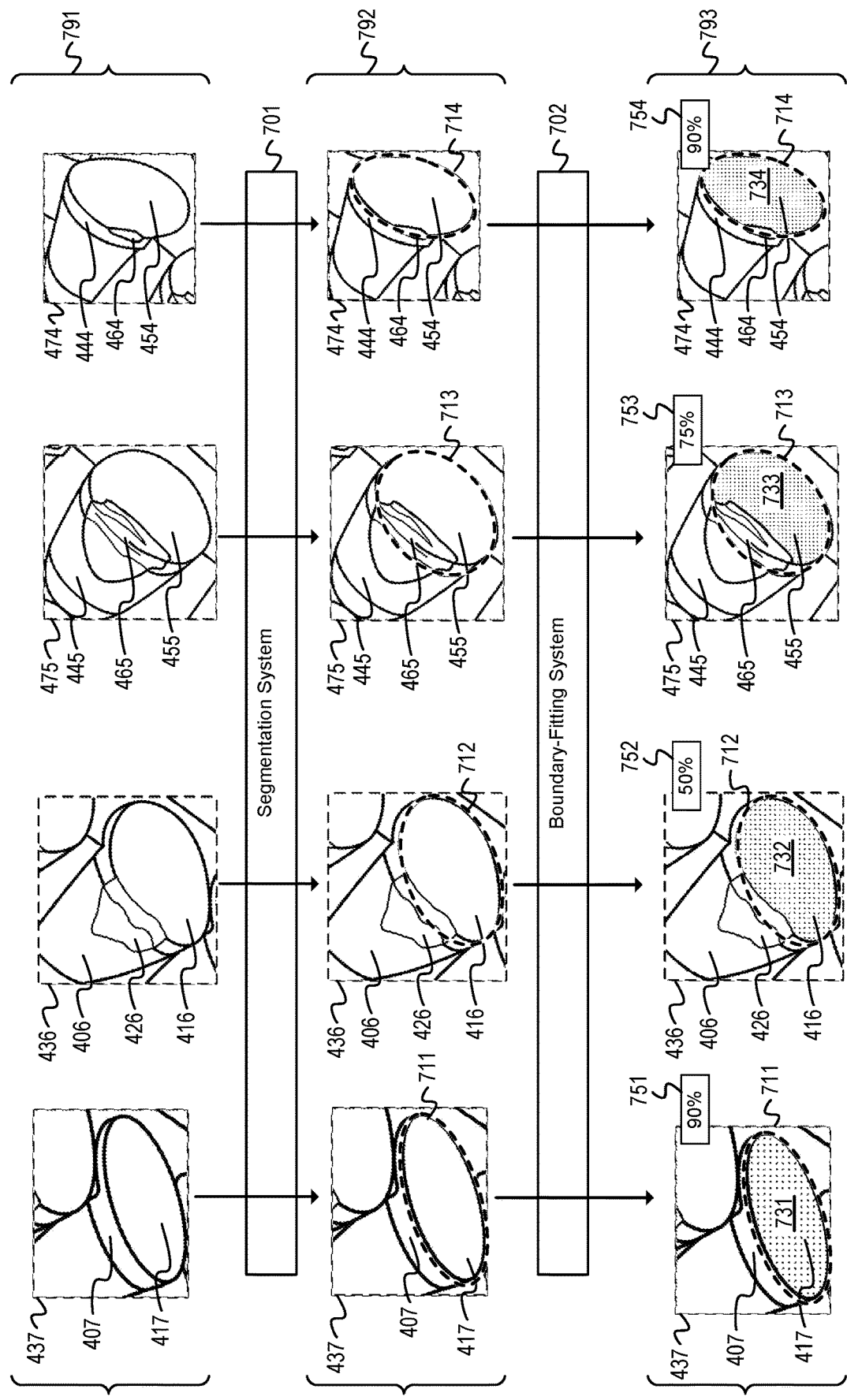
FIG. 7 is set of example results of a boundary-fitting system and segmentation system applied to a set of images of identified cutters shown in FIG. 4.

FIG. 7 is set of example results of a boundary-fitting system and segmentation system applied to a set of images of identified cutters shown in FIG. 4. A boundary-fitting system 701 can fit surface boundaries to each of the identified set of bit cutters 406, 407, 444 and 445 in the pre-processing set 891 based on images of the bounded regions 436, 437, 474 and 475. The bit cutter 406 includes a cutter surface 416 and a degraded portion 426. The bit cutter 407 includes a cutter surface 417. The bit cutter 444 includes a cutter surface 454 and a degraded portion 464. The bit cutter 445 includes a cutter surface 455 and a degraded portion 465. The boundary-fitting system 701 can generate the surface boundaries 711-714 shown in the post-fitting set 892, each of which are superimposed on their corresponding set of bit cutters 406, 407, 444 and 445. In some embodiments, the surface boundaries 711-714 can be ellipses. In some embodiments, surface boundaries can be other shapes such as circles, quadrilaterals, triangles, etc. The boundary-fitting system 701 can use various fitting methods such as an interpolation fitting method, a machine-learning fitting method, a function fitting method, etc. For example, the boundary-fitting system 701 can generate the surface boundaries 711-714 for the cutter surfaces 417, 416, 465, and 464, respectively by analyzing images of the bounded regions 437, 436, 475, and 474, respectively, using a function fitting method. In some embodiments, the boundary-fitting system 701 may comprise a software program module that operates to generate the boundaries.

In addition, a segmentation system 702 can apply a segmentation operation similar to or the same as that described for block 324 to the set of cutter surfaces 416-417 and 454-455 in the post-fitting set 892 to segment a surface into covered region 731-734 shown the post-segmented set 893. For example, the covered area of the cutter surfaces 416-417 and 454-455 can be darker in an image than an uncovered region of the surfaces in the same image. By comparing the pixel brightness value of each pixel in the images of the cutter surfaces 416-417 and 454-455 within their respective surface boundaries, the system 702 can determine which regions of the cutter are covered and uncovered, wherein an uncovered portion of the cutter is a degraded portion of the cutter. For example, the segmentation system 702 can compare the pixel brightness of each pixel in the surface boundary 711 within an image of the bounded region 437 to a brightness threshold in order to determine the extent of the covered region 731. Similarly, the segmentation system 702 can compare the pixel brightness of each pixel in the surface boundary 712 within an image of the bounded region 436 to a brightness threshold in order to determine the extent of the covered region 732 and make it distinct from the degraded portion 426. In addition, the segmentation system 702 can compare the pixel brightness of each pixel in the surface boundary 713 within an image of the bounded region 475 to a brightness threshold in order to determine the extent of the covered region 733 and make it distinct from the degraded portion 465. Furthermore, the segmentation system 702 can compare the pixel brightness of each pixel in the surface boundary 714 within an image of the bounded region 474 to a brightness threshold in order to determine the extent of the covered region 734 and make it distinct from the degraded portion 464. In some embodiments, the segmentation system 702 may comprise a software program module that operates to perform the segmentation operation described above.

With reference to FIG. 3, the system can perform operations similar to or the same as those described for block 328 to generate comparison values 751-754. The system 702 can generate comparison values 751-754 for each of the bit cutters 406, 407, 444 and 445. A comparison value is a metric of the cutter's physical condition and can be reported as a percentage of the cutter that is covered in a PDC material. For example, the comparison value can be a fraction, and comparison value corresponding with the bit cutter 407 can have a numerator equal to the area of the shaded region 731 and a denominator equal to the area in the surface boundary 711.

With further reference to FIG. 3, results such as the comparison values 751-754, the areas bounded by the surface boundaries 711-714, etc. may all comprise context-specific cutter information. This context-specific cutter information can be mapped to its corresponding bit cutter in a 3D model using operations described for block 332, wherein the data structure can be represented in Table 1 below:

TABLE 1

| Identifier Value | Grading Value | Primary Charac- teristic | Secondary Charac- teristic | Covered Region (square centimeters) | Covered Ratio |
| --- | --- | --- | --- | --- | --- |
| 1-04 | A | WT | LB | 1.8 | 90% |
| 1-05 | B | SP | WT | 1.0 | 50% |
| 2-03 | C | LD | WT | 1.5 | 75% |
| 2-04 | A | ER | SP | 1.8 | 90% |

For example, with reference to Table 1 above, a system can map the comparison value 751 to an identifier value "1-04" corresponding to the bit cutter 407 in a 3D model of a drill bit. The system can also map an area bounded by the surface boundary 712 to an identifier value "1-05" corresponding to the bit cutter 406 in the 3D model. In addition, the system can also map an area of the covered region 733 to an identifier value "2-03" corresponding to the bit cutter 445 in the 3D model. Furthermore, the system 702 can also map an area of the covered region 734 to an identifier value "2-04" corresponding to the bit cutter 444 in the 3D model. In some embodiments, additional characteristics, values, categories, etc. can be mapped to identifier values corresponding to a cutter on a drill bit.

Example Onshore Drilling Platform

Figure 8:
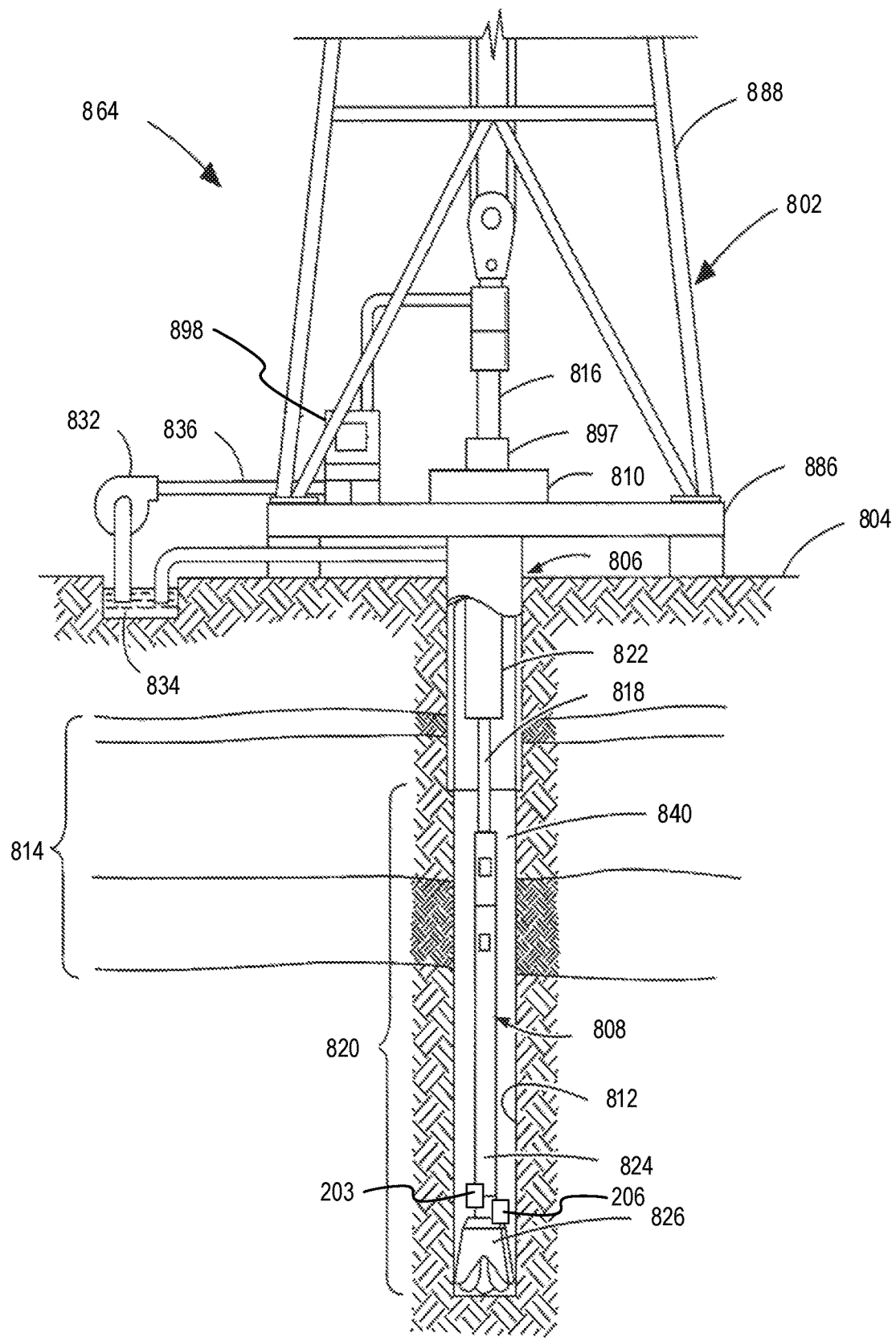
FIG. 8 is an elevation view of an onshore platform that includes a drill bit in a borehole.

FIG. 8 is an elevation view of an onshore platform that includes a drill bit in a borehole. FIG. 8 shows a system 864 that includes a portion of a drilling rig 802 located at the surface 804 of a well 806. Drilling of oil and gas wells is commonly carried out using a string of drill pipes connected together so as to form a drilling string 808 that is lowered through a rotary table 810 into a borehole 812. Here a drilling platform 886 is equipped with a derrick 888 that supports a hoist.

The drilling rig 802 may thus provide support for the drill string 808. The drill string 808 may operate to rotate the rotary table 810 for drilling the borehole 812 through subsurface formations 814. The drill string 808 may include a Kelly 816, drill pipe 818, and a bottom hole assembly 820, perhaps located at the lower portion of the drill pipe 818.

The bottom hole assembly 820 may include drill collars 822, a down hole tool 824, and a drill bit 826 that includes a set of cutters. The drill bit 826 may operate to create a borehole 812 by penetrating the surface 804 and subsurface formations 814. The down hole tool 824 may comprise any of a number of different types of tools including measurement while drilling (MWD) tools, logging while drilling (LWD) tools, and others.

During drilling operations, the drill string 808 (perhaps including the Kelly 816, the drill pipe 818, and the bottom hole assembly 820) may be rotated by the rotary table 810. In addition to, or alternatively, the bottom hole assembly 820 may also be rotated by a motor such as a mud motor that is located down hole. The drill collars 822 may be used to add weight to the drill bit 826. The drill collars 822 may also operate to stiffen the bottom hole assembly 820, allowing the bottom hole assembly 820 to transfer the added weight to the drill bit 826, and in turn, to assist the drill bit 826 in penetrating the surface 804 and subsurface formations 814. With reference to FIG. 3 above, the computer system 898 can perform some or all of the operations described above in the flowchart 300 (including any and all operations described with respect to FIGS. 5 and 6) to map context-specific specific information to the cutters on the drill bit 826. In some embodiments, the cameras 203, 206 may be located downhole, proximate to the drill bit 826.

During drilling operations, a mud pump 832 may pump drilling fluid (sometimes known by those of ordinary skill in the art as "drilling mud") from a mud pit 834 through a hose 836 into the drill pipe 818 and down to the drill bit 826. The drilling fluid can flow out from the drill bit 826 and be returned to the surface 804 through an annular area 840 between the drill pipe 818 and the sides of the borehole 812. The drilling fluid may then be returned to the mud pit 834, where such fluid is filtered. In some embodiments, the drilling fluid can be used to cool the drill bit 826, as well as to provide lubrication for the drill bit 826 during drilling operations. Additionally, the drilling fluid may be used to remove subsurface formation 814 cuttings created by operating the drill bit 826.

Example Computer

Figure 9:
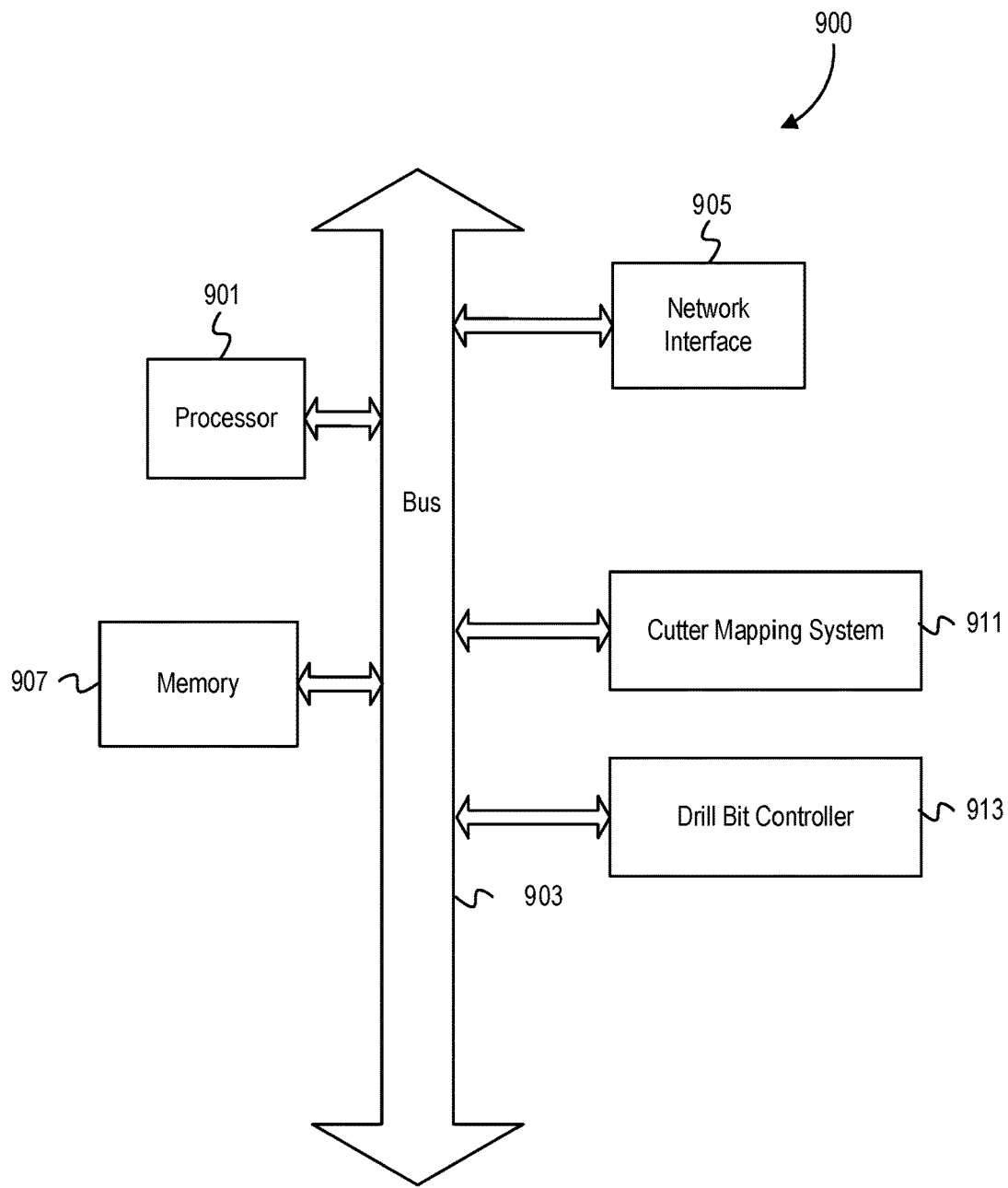
FIG. 9 is a schematic diagram of an example computer device.

FIG. 9 is a schematic diagram of an example computer device. A computer device 900 includes a processor 901 (possibly including multiple processors, multiple cores, multiple nodes, and/or implementing multi-threading, etc.). The computer device 900 includes a memory 907. The memory 907 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer device 900 also includes a bus 903 (e.g., PCI, ISA, PCI-Express, HyperTransport® bus, InfiniBand® bus, NuBus, etc.) and a network interface 905 (e.g., a Fiber Channel interface, an Ethernet interface, an internet small computer system interface, SONET interface, wireless interface, etc.).

The computer device 900 can include a cutter mapping system 911. The cutter mapping system 911 can perform one or more operations to map context-specific cutter information to one or more cutters as described above. For example, the cutter mapping system 911 can identify cutters on a drill bit image and set one or more grading values for the cutter using a classification model. Additionally, the cutter mapping system 911 can fit a surface boundary to a cutter surface based on an image of the cutter surface. With reference to FIG. 5 and FIG. 7 above, the cutter mapping system 911 may further comprise the grading system 501, boundary-fitting system 701, and segmentation system 702.

The computer device 900 can include a drill bit controller 913. The drill bit controller 913 can perform one or more operations to control a drill bit as described above. For example, the drill bit controller 913 can lower a drill bit during a drilling operation. Additionally, the drill bit controller 913 can activate a drill bit during the drilling operation. In addition, although illustrated together, the computer device 900 can include the drill bit controller 913 without the cutter mapping system 911 or include the cutter mapping system 911 without the drill bit controller 913. The cutter mapping system 911 may be similar to or identical to the computer system 998, shown in FIG. 9.

Any one of the previously described functionalities can be partially (or entirely) implemented in hardware and/or on the processor 901. For example, the functionality can be implemented with an application specific integrated circuit, in logic implemented in the processor 901, in a co-processor on a peripheral device or card, etc. Further, realizations can include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 can be coupled to the processor 901.

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit" or "system." The functionality presented as individual units in the example illustrations can be organized differently in accordance with any one of platform (operating system and/or hardware), application ecosystem, interfaces, programmer preferences, programming language, administrator preferences, etc.

Any combination of one or more machine readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

Terminology and Variations

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. A set of items can have only one item or more than one item. For example, a set of numbers can be used to describe a single number or multiple numbers.

Example Embodiments

Example embodiments include the following:

Embodiment 1: A method comprising identifying a cutter on a drill bit based on a drill bit image, assigning a grading value of the cutter based on a classification model of a machine learning system, wherein the classification model is generated based on a set of training cutter images associated with drill bit characteristics indicators, determining a surface parameter based on a surface of the cutter, generating a comparison value based on the surface parameter, and mapping a set of cutter information to the cutter on the drill bit, wherein the set of cutter information comprises the grading value and the comparison value.

Embodiment 2 The method of claim 1, wherein generating the comparison value comprises generating the comparison value using a machine-learning classification network of the machine learning system.

Embodiment 3. The method of any of claims 1 to 2, wherein identifying the cutter on the drill bit comprises analyzing an image of the drill bit using an object recognition model of the machine learning system.

Embodiment 4. The method of any of claims 1 to 3, further comprising determining a boundary of the surface of the cutter, wherein determining the surface parameter comprises determining the boundary of the surface of the cutter, and determining a covered area on the surface of the cutter based on the boundary using a segmentation method, wherein generating the comparison value is based on the covered area and the boundary.

Embodiment 5. The method of any of claim 4, wherein the boundary is an ellipse, and wherein determining the covered area comprises analyzing an image of the cutter, and fitting the ellipse to the surface of the cutter based on at least one of an interpolation fitting method, a machine-learning fitting method, and a function fitting method.

Embodiment 6. The method of any of claims 4 to 5, further comprising determining the covered area on the cutter based on brightness values corresponding to image pixels representing the cutter within the boundary.

Embodiment 7. The method of any of claims 1 to 6, wherein mapping the set of cutter information comprises determining a corresponding cutter position based on a three-dimensional model of the drill bit.

Embodiment 8. The method of any of claims 1 to 7, further comprising assigning a primary characteristic and a secondary characteristic to the cutter.

Embodiment 9. A method comprising acquiring a training set of images, wherein the training set of images comprise a set of images of cutters, and training a machine learning system using the training set of images, wherein the machine learning system comprises a set of weights corresponding to one or more nodes of a neural network of the machine learning system, and wherein the machine learning system provides an output representing whether an image includes a visual representation of a cutter.

Embodiment 10. The method of claim 9, further comprising training the machine learning system based on a set of cutter positions, wherein the machine learning system provides a predicted cutter position based on an image of the cutter.

Embodiment 11. The method of any of claims 9 to 10, further comprising training the machine learning system to determine a comparison value based on the training set of images, wherein at least one of the training set of images includes a visual representation of a portion of a cutter surface not covered by polycrystalline diamond compact.

Embodiment 12. The method of any of claims 9 to 11, further comprising training the machine learning system using a set of training classifications, wherein each of the set of training classifications correspond with one of a set of cutter characteristics.

Embodiment 13. The method of any of claim 12, wherein the set of cutter characteristics comprises an indication that the cutter is worn and is associated with one or more images of a cutter showing at least one portion of a cutter surface that is not covered by a PDC material.

Embodiment 14. The method of any of claims 12 to 13, wherein training the machine learning system comprises training the machine learning system based on a primary characteristic and a secondary characteristic.

Embodiment 15: An apparatus comprising a processor and a machine-readable medium having program code executable by the processor to cause the apparatus to identify a cutter on a drill bit based on a drill bit image using a machine learning system, determine a surface parameter based on a surface of the cutter, generate a comparison value based on the surface parameter, and generate a drill bit model comprising an indicator for a representation of the cutter on the drill bit model, wherein the indicator corresponds with the comparison value, and wherein the indicator corresponds with a location of the cutter on the drill bit.

Embodiment 16: The apparatus of Embodiment 15, further comprising program code executable by the processor to cause the apparatus to provide a predicted cutter position associated with the cutter.

Embodiment 17: The apparatus of any of Embodiments 15, further comprising program code executable by the processor to cause the apparatus to determine a boundary of the surface of the cutter, wherein determining the surface parameter comprises determining the boundary of the surface of the cutter, and determine a covered area on the surface of the cutter based on the boundary using a segmentation method, wherein generating the comparison value is based on the covered area and the boundary.

Embodiment 18: The apparatus of any of Embodiments 15, further comprising program code executable by the processor to cause the apparatus to determine a corresponding cutter position based on a three-dimensional model of the drill bit.

Embodiment 19: The apparatus of any of Embodiments 15, further comprising program code executable by the processor to cause the apparatus to: determine a boundary of the surface of the cutter, wherein determining the surface parameter comprises determining the boundary of the surface of the cutter and determine a covered area on the surface of the cutter based on the boundary using a segmentation method, wherein generating the comparison value is based on the covered area and the boundary.

Embodiment 20: The apparatus of Embodiment 19, further comprising program code executable by the processor to cause the apparatus to determine the covered area on the cutter based on brightness values corresponding to image pixels representing the cutter within the boundary.

What is claimed is:

1. A method comprising:
   identifying a cutter on a drill bit based on a drill bit image and an object recognition model of a machine learning system, the machine learning system includes one or more neural networks;
   assigning a grading value of the cutter based on a classification model of the machine learning system, wherein a neural network of the one or neural networks is trained using a set of training cutter images associated with drill bit characteristics indicators and a set of training classifications;
   determining a surface parameter based on a surface of the cutter;
   generating a comparison value based on the surface parameter; and
   mapping a set of cutter information to the cutter on the drill bit, wherein the set of cutter information comprises the grading value and the comparison value.

2. The method of claim 1, wherein generating the comparison value comprises generating the comparison value using a machine-learning classification network of the machine learning system.

3. The method of claim 1, wherein identifying the cutter on the drill bit comprises analyzing an image of the drill bit using the object recognition model of the machine learning system.

4. The method of claim 1, further comprising:
   determining a boundary of the surface of the cutter, wherein determining the surface parameter comprises determining the boundary of the surface of the cutter; and
   determining a covered area on the surface of the cutter based on the boundary using a segmentation method, wherein generating the comparison value is based on the covered area and the boundary.

5. The method of claim 4, wherein the boundary is an ellipse, and wherein determining the covered area comprises:
   analyzing an image of the cutter; and
   fitting the ellipse to the surface of the cutter based on at least one of an interpolation fitting method, a machine-learning fitting method, and a function fitting method.

6. The method of claim 4, further comprising determining the covered area on the cutter based on brightness values corresponding to image pixels representing the cutter within the boundary.

7. The method of claim 1, wherein mapping the set of cutter information comprises determining a corresponding cutter position based on a three-dimensional model of the drill bit.

8. The method of claim 1, further comprising assigning a primary characteristic and a secondary characteristic to the cutter.

9. The method of claim 1, wherein the object recognition model of a machine learning system is trained using a set of images that do not show any cutters and a set of images that show one or more cutters.

10. The method of claim 1, wherein the classification model can analyze various cutter characteristics as classification model inputs, wherein the cutter characteristics can include quantitative characteristics and at least one quality indicator.

* * * * *